(12) United States Patent
Klovdahl et al.

(10) Patent No.: US 11,486,306 B2
(45) Date of Patent: Nov. 1, 2022

(54) FLUSH FLUID INLET DESIGNS FOR AERO-ACOUSTIC TONE MITIGATION OF AIRCRAFT

(71) Applicant: The Boeing Company, Chicago, IL (US)

(72) Inventors: Garrett D. Klovdahl, Everett, WA (US); Jennifer M. Shuster-Clark, Seattle, WA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 16/904,780

(22) Filed: Jun. 18, 2020

(65) Prior Publication Data
US 2021/0394917 A1    Dec. 23, 2021

(51) Int. Cl.
*F02C 7/04* (2006.01)
*B64D 33/02* (2006.01)
*B64C 21/06* (2006.01)
*B64D 29/02* (2006.01)

(52) U.S. Cl.
CPC ............ *F02C 7/04* (2013.01); *B64C 21/06* (2013.01); *B64D 33/02* (2013.01); *B64D 29/02* (2013.01); *B64D 2033/0226* (2013.01); *B64D 2241/00* (2013.01); *F05D 2220/323* (2013.01); *F05D 2250/184* (2013.01)

(58) Field of Classification Search
CPC . F02C 7/04; F02C 7/045; B64C 21/06; B64D 33/02; B64D 29/02; B64D 2033/0226; B64D 2241/00; F05D 2220/323; F05D 2250/184
See application file for complete search history.

(56) References Cited

U.S. PATENT DOCUMENTS

| | | | |
|---|---|---|---|
| 4,174,083 A | 11/1979 | Mohn | |
| 4,418,879 A | 12/1983 | Vanderleest | |
| 4,696,442 A | 9/1987 | Mazzitelli | |
| 4,703,904 A | 11/1987 | Haslund | |
| 5,269,135 A * | 12/1993 | Vermejan | F02C 7/04 60/266 |
| 5,884,843 A | 3/1999 | Lidstone et al. | |
| 6,050,527 A | 4/2000 | Hebert et al. | |
| 6,058,696 A * | 5/2000 | Nikkanen | F02C 7/04 60/262 |

(Continued)

*Primary Examiner* — Steven M Sutherland
(74) *Attorney, Agent, or Firm* — Quinn IP Law

(57) ABSTRACT

Presented are flush-mounted fluid inlets, methods for making/using such fluid inlets, and aircraft equipped with flush-mounted air inlets for engine intake/cooling, bleed air flow, etc. A fluid inlet device is presented for improving vehicle aerodynamic performance. The fluid inlet device includes an inlet base that rigidly mounts to the vehicle, laying substantially flush with a washed outer surface across which fluid flows. The inlet base has a mouth that fluidly couples with a vehicle duct. Two sidewalls are attached to the inlet base, extending between leading and trailing edges of the inlet mouth. An inlet ramp, which is interposed between and attached to the sidewalls, projects inward at an oblique angle from the mouth's leading edge. A highlight is attached to the inlet base, projecting forward from the trailing edge towards the leading edge of the mouth. The highlight has a waveform plan-view profile and undulating outer surface.

23 Claims, 4 Drawing Sheets

(56) References Cited

U.S. PATENT DOCUMENTS

| | | |
|---|---|---|
| 7,222,819 B1 | 5/2007 | Kelnhofer |
| 8,632,031 B2 | 1/2014 | Shmilovich et al. |
| 8,827,212 B1 | 9/2014 | Shmilovich et al. |
| 9,611,050 B2 | 4/2017 | Tretow et al. |
| 9,803,546 B2 | 10/2017 | Willie et al. |
| 9,810,147 B2 | 11/2017 | Tretow et al. |
| 2010/0126182 A1* | 5/2010 | Hoover .................... F02K 3/06 60/785 |
| 2014/0119878 A1 | 5/2014 | Shmilovich et al. |
| 2015/0360790 A1* | 12/2015 | Rouyre .................... B64C 7/02 244/53 B |
| 2016/0152324 A1 | 6/2016 | Graff et al. |

\* cited by examiner

FLUSH FLUID INLET DESIGNS FOR AERO-ACOUSTIC TONE MITIGATION OF AIRCRAFT

TECHNICAL FIELD

The present disclosure relates generally to features for improving vehicle aerodynamics. More specifically, aspects of this disclosure relate to systems, methods, and devices for abating vortex shedding across air inlets of aircraft engines.

BACKGROUND

Fixed-wing aircraft, such as airplanes and gliders, achieve flight using wings that are immovably attached to the aircraft's airframe and generate aerodynamic lift through a positive angle of attack during forward travel through the air. The wing's airfoil cross-section deflects air downward as the aircraft is propelled forward; this produces a dynamic pressure-gradient on the wing that, in turn, lifts and buoys the airplane during flight. In contrast to conventional fixed-wing aircraft, vertical takeoff and landing (VTOL) aircraft are, as the name implies, capable of vertical takeoffs and landings as well as intermittent hovering flight. The most recognizable example of VTOL aircraft is the helicopter, which is a rotary-wing aircraft (rotorcraft) with engine-driven rotor blades that provide lift and thrust to the aircraft. Tiltwing and tiltrotor aircraft are hybrid-type VTOL that incorporate features of both fixed-wing and rotary-wing vehicles for flight operations.

Many current production aircraft are equipped with stock body hardware that is engineered to improve the aerodynamic performance of the vehicle. Most fixed-wing aircraft, for example, utilize an aerodynamically efficient cruise wing configuration for steady-state flight, such as cruising operations, and a modified high-lift wing configuration to modulate lift forces for transient-state flight, such as takeoff and landing operations. Another available type of passive flow control (PFC) feature used in the aerospace industry for drag reduction and noise mitigation is the flush fluid inlet, which exhibits improved aerodynamic recovery properties while inlet air is flowing and low losses when inlet air is not flowing. In a turbofan engine, for example, air is drawn into the engine nacelle via flush-mounted main and auxiliary air inlets. This air flow is pressurized for transmission through the engine core, through a fan duct that surrounds the core, and to supply a "bleed flow" for auxiliary aircraft systems, such as precooler and climate control systems.

During certain flight operations, such as a cruise phase of flight, bleed air intake may not be needed by the auxiliary aircraft systems. Thus, bleed air flow may be reduced during these flight conditions to a low-flow state, which significantly reduces auxiliary air intake, or a no-flow state, which altogether stops auxiliary air intake. A flow control valve inside the internal ductwork of the nacelle and fluidly downstream from the flush air inlet may be used to modulate airflow through the inlet. However, in a low-flow or no-flow state when air flow is restricted or eliminated, a vortex may shed across the face of the air inlet. In particular, when fluid flows across an open end of a passage with a closed or nearly closed downstream end, amplified resonant pressure waves can form in what is colloquially known as the "Coke Bottle Effect". This coherent shedding may cause pressure oscillations in the inlet duct; these pressure oscillations may peak when the frequency of the shedding aligns with the natural frequency of the duct cavity.

SUMMARY

Presented herein are flush-mounted fluid inlet devices for improved vehicle aerodynamic performance, methods for making and methods for using such fluid inlet devices, and aircraft equipped with flush-mounted main and auxiliary air inlets for engine intake/cooling and bleed air flow. By way of example, a flush auxiliary air inlet includes an inlet mouth with opposing upstream (fore or leading) and downstream (aft or trailing) edges; the downstream edge has a waveform plan-view profile that is engineered to reduce coherent shedding across the inlet mouth while maintaining inlet performance. Projecting into the air duct, at an oblique angle from the upstream edge of the air inlet, is an inlet ramp that guides air into the nacelle or airframe. The ramp surface has a crosswise undulating curvature with recesses that extend in a fore-aft direction and progressively increase/decrease in depth and/or width in the fore-aft direction. The number of landings—elevated segments of the ramped surface interleaved with the recesses—may correspond with the spatial frequency of the peaks in the waveform profile, e.g., one landing for each crest in a sinusoidal profile, and one recess for each trough in the sinusoidal profile. In addition, each landing segment may be aligned with a respective crest segment of the trailing edge. In so doing, the flush air inlet helps to mitigate unwanted pressure oscillations and, thus, reduces hardware fatigue and degradation during low-flow and no-flow inlet states.

Aspects of this disclosure are directed to flush air inlet designs for aero-acoustic tone mitigation. For instance, a fluid inlet device is presented for improving the aerodynamic characteristics of a vehicle, such as a fixed-wing airplane. The fluid inlet device includes an inlet base that rigidly mounts to the vehicle, laying substantially flush with a washed surface of the vehicle across which fluid flows. The inlet base has an inlet mouth that fluidly couples with a fluid duct for intake of the flowing fluid. Two sidewalls are attached to the inlet base, extending between leading and trailing edges of the inlet mouth. An inlet ramp, which is interposed between and attached to the pair of sidewalls, projects inward at an oblique angle from the leading edge of the mouth. A highlight is attached to the inlet base, projecting forward from the trailing edge of the mouth towards the leading edge of the mouth. The highlight includes a waveform plan-view profile. Disclosed devices may be employed in both aircraft and non-aircraft applications alike.

Additional aspects of this disclosure are directed to aircraft equipped with flush-mounted main and auxiliary air inlets for engine intake/cooling, bleed air flow, etc. As used herein, the terms "aircraft" and "vehicle" and permutations thereof may be used interchangeably and synonymously to include any relevant vehicle platform, such as fixed-wing aircraft, rotary-wing aircraft, VTOL aircraft, airships, and UAVs, including manned, unmanned, and fully or partially autonomous variants thereof. In an example, an aircraft includes a load-bearing airframe with landing gear, rotor assemblies and/or wings, optional propulsion and guidance systems, and other standard original equipment. One or more engine assemblies are securely attached to the airframe, e.g., suspended under the main wings. The engine's nacelle includes an exterior washed surface across which streamwise ambient air flows, and an air duct for intake of the air flow.

Continuing with the discussion of the foregoing example, the aircraft also includes one or more fluid inlet devices. Each fluid inlet device includes an inlet base, an inlet ramp, a pair of sidewalls, and a highlight, which is a downstream, aft surface of the intake that defines a boundary between exterior and interior surfaces of the intake. The inlet base is mounted to the engine nacelle, laying substantially flush with the washed surface. The inlet base has an inlet mouth that is fluidly coupled with the duct. Outer (proximal) ends of the sidewalls are adjoined to the inlet base and inner (distal) ends of the sidewalls are adjoined to the ramp. The sidewalls extend between leading and trailing edges of the inlet mouth, projecting into the nacelle towards the duct. The inlet ramp is interposed between the sidewalls, projecting into the engine nacelle at an oblique angle from the leading edge of the inlet mouth. The highlight adjoins the inlet base and projects from the trailing edge of the inlet mouth towards the leading edge of the inlet mouth. The highlight has a waveform plan-view profile extending crosswise relative to the inlet mouth.

Further aspects of this disclosure are directed to methods for making and methods for using any of the disclosed fluid inlet devices, engine assemblies, and/or aircraft. For instance, a method is presented for manufacturing a fluid inlet device for a vehicle. This representative method includes, in any order and in any combination with any of the above and below disclosed options and features: forming an inlet base configured to mount to vehicle structure of the vehicle substantially flush with a washed surface of the vehicle, the inlet base defining an inlet mouth configured to fluidly couple with a fluid duct of the vehicle; attaching a pair of sidewalls to the inlet base, the sidewalls extending between a leading edge and a trailing edge of the inlet mouth; attaching an inlet ramp to the inlet base with the inlet ramp interposed between the sidewalls, the inlet ramp projecting at an oblique angle from the leading edge of the mouth; and, attaching a highlight to the inlet base, the highlight projecting from the trailing edge of the inlet mouth towards the leading edge of the inlet mouth and including a waveform profile.

For any of the disclosed systems, methods, devices, and aircraft, the waveform profile of the highlight may be a sinusoidal waveform that extends transversely across the inlet mouth. Terminal ends of the waveform may adjoin the inlet sidewalls. A forward-facing, leading edge of the highlight may be filleted. As a further option, an outer surface of the highlight may have an undulating curvature that extends crosswise relative to the inlet mouth. Additionally, an outer surface of the highlight may be substantially coplanar with an outer surface the inlet base and, thus, the washed surface.

For any of the disclosed systems, methods, devices, and aircraft, a ratio of a crest-to-trough height of the highlight's waveform profile to a fore-aft length of the inlet mouth may be between about 0.01 to about 1.0. As a further option, a highlight aspect ratio $AR_H$ of the waveform profile may be between about 0.1 to about 10.0, and may be defined as $AR_H=H/B$, where H is a crest-to-trough height of the waveform profile, and B is a trough-to-trough wavelength of the waveform profile. The sidewalls may be substantially parallel to each other and substantially orthogonal to the inlet ramp and the inlet base. As a further option, the inlet base, sidewalls, ramp, and highlight may be integrally formed as a single-piece, unitary structure.

For any of the disclosed systems, methods, devices, and aircraft, an exterior surface of the inlet ramp may have an undulating curvature that extends crosswise between the pair of sidewalls. The inlet ramp's undulating curvature may include multiple recessed channels that are interleaved with multiple raised landings. The recessed channels and raised landings extend in a fore-aft direction between the leading and trailing edges of the inlet mouth. In this instance, the waveform profile may include multiple crests that are interleaved with multiple troughs; each crest may be aligned with a raised landing, while each trough may be aligned with a recessed channel. The width and/or depth of the ramp's channels may vary in the fore-aft direction, e.g., increasing then decreasing in width/depth from the leading edge towards the trailing edge of the inlet mouth.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
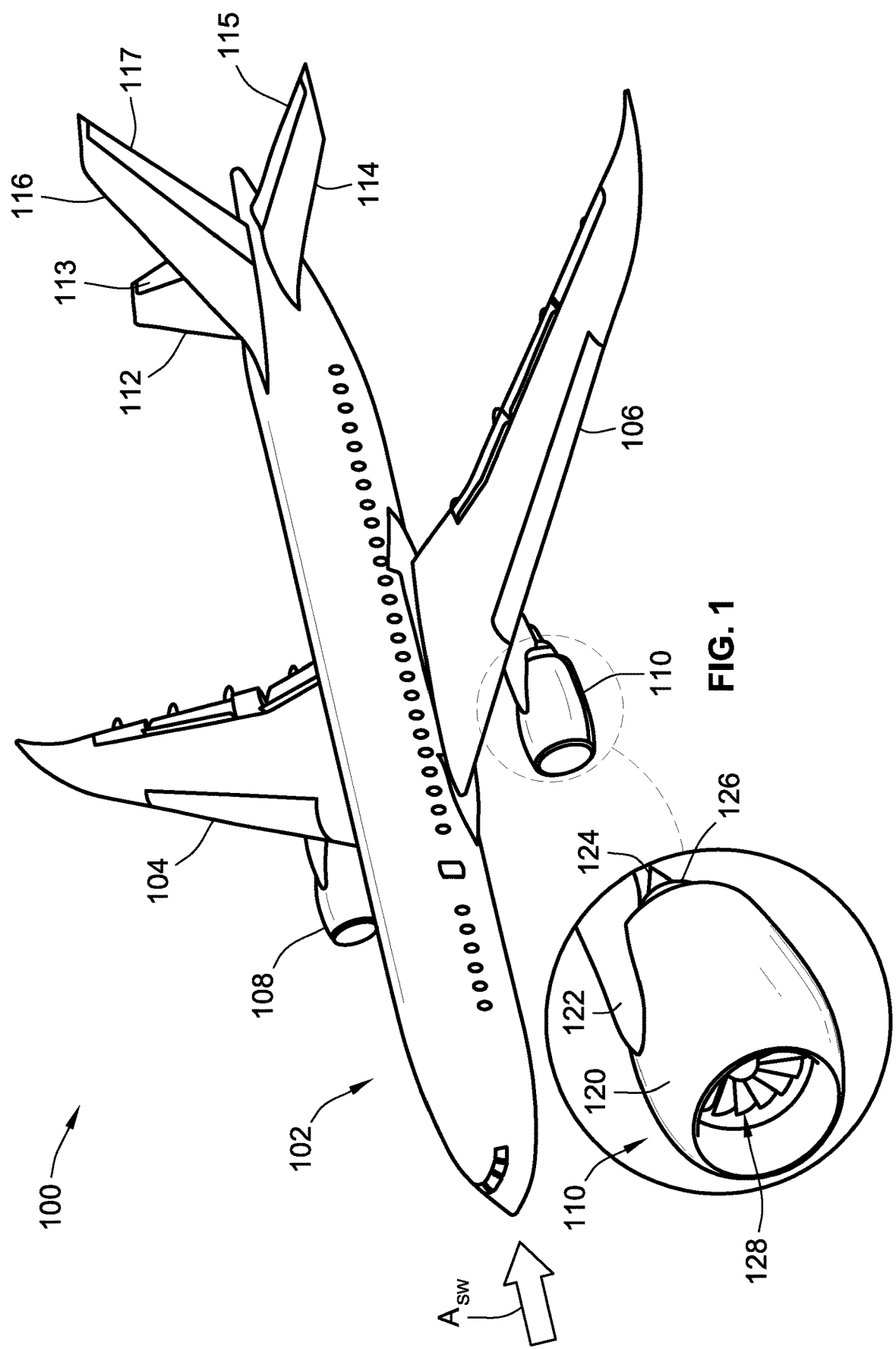
FIG. 1 is an elevated, perspective-view illustration of a representative aircraft with an enlarged, inset view of the aircraft's turbofan jet engine assembly with an engine nacelle having a flush air inlet in accordance with aspects of the present disclosure.
Figure 2:
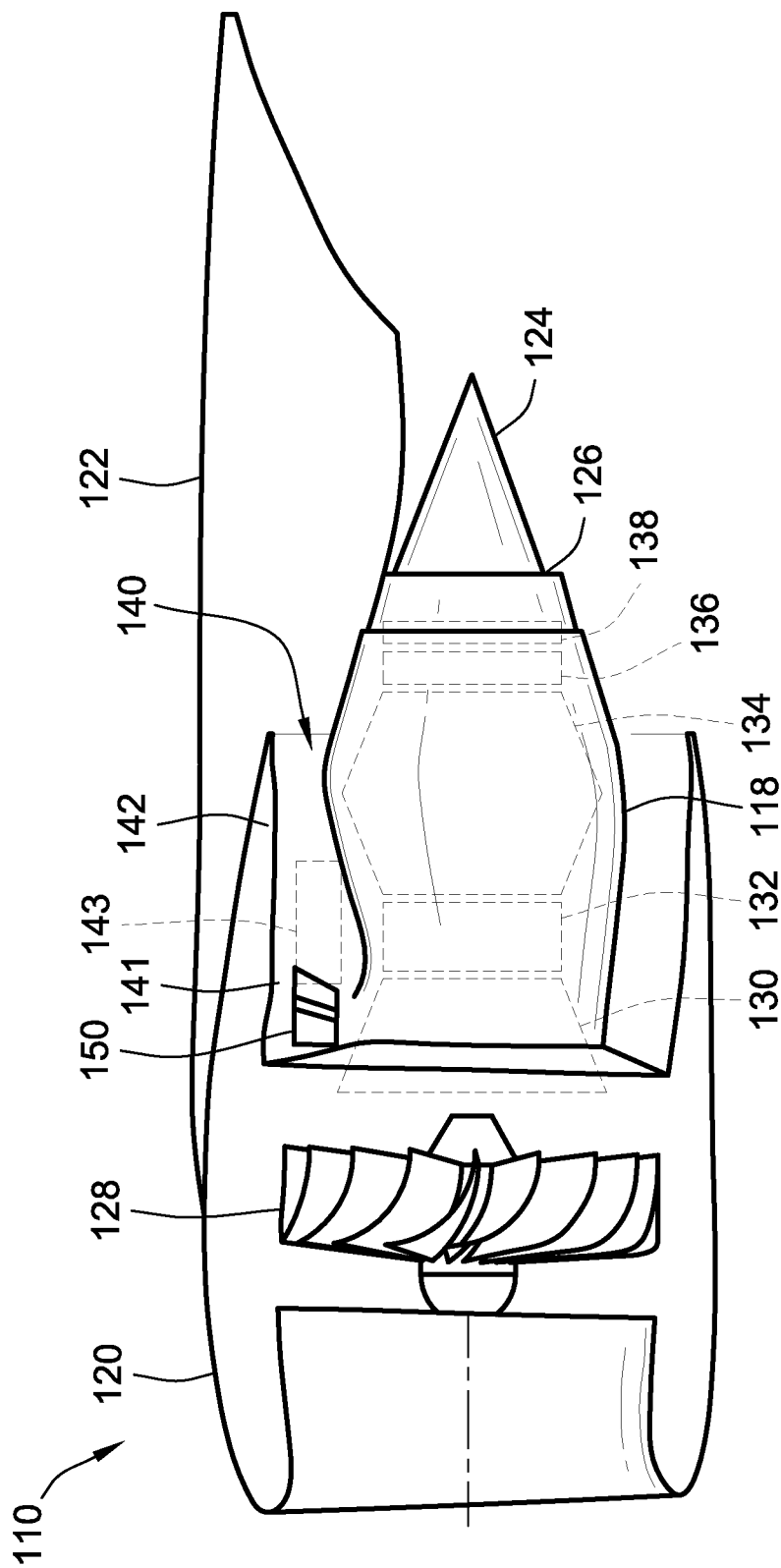
FIG. 2 is a partially broken away, side-view illustration of the representative turbofan jet engine of FIG. 1.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Technical Field, Background, Summary, Description of the Drawings, and Detailed Description sections, but not explicitly set forth in the claims, should not be incorporated into the claims, singly or collectively, by implication, inference or otherwise. Moreover, the drawings discussed herein are not necessarily to scale and are provided purely for instructional purposes. Thus, the specific and relative dimensions shown in the drawings are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, front, back, left, right, etc., may be with respect to an aircraft that is operatively oriented in an upright position on a horizontal support surface.

Referring now to the drawings, wherein like reference numbers refer to like features throughout the several views, there is shown in FIG. 1 a representative aircraft, which is designated generally at 100 and portrayed herein for purposes of discussion as a commercial-class, podded-engine jet airliner. The illustrated aircraft 100—also referred to herein as "airplane" or "vehicle" for brevity—is merely an exemplary application with which aspects and features of this disclosure may be practiced. In the same vein, implementation of the present concepts for an auxiliary engine air intake should also be appreciated as an exemplary implementation of the concepts disclosed herein. As such, it will be understood that aspects of the present disclosure may be incorporated into other flush fluid inlet applications, may be implemented for any logically relevant type of aircraft architecture (e.g., fixed-wing, rotary-wing, hybrid VTOL, etc.), and may be utilized in both aircraft and non-aircraft applications alike. Lastly, only select components of the aircraft have been shown and will be described in additional detail herein. Nevertheless, the aircraft, jet engines, and flush fluid intakes discussed below may include numerous additional and alternative features, and other available peripheral hardware, for carrying out the various functions of this disclosure.

Aircraft 100 of FIG. 1 is a fixed-wing aircraft with an elongated main body section 102—most commonly known as the "fuselage"—and a pair of (first and second) main wings 104 and 106 rigidly attached to main body 102. The fuselage 102, with its major longitudinal dimension extending in a streamwise direction of oncoming ambient airflow $A_{SW}$, is generally designed to hold a flight crew, passengers, cargo, etc. The main wings 104, 106 may each be typified as a rigid, airfoil-shaped structure that produces an aerodynamic force, such as lift or drag or moment, during propulsion through a fluid. The main wings 104, 106 project transversely from the fuselage 102 in a sweptback, mid-mount wing configuration, i.e., angled in a rearward direction from opposing sides of the main body section 102. While any of an assortment of available engine types and layouts may be implemented, the aircraft 100 of FIG. 1 employs a wing-mounted, twin-engine layout with a first turbofan engine 108 mounted beneath the first wing 104 and a second turbofan engine 110 mounted beneath the second wing 106. It is envisioned that the aircraft 100 may take on other types of engine layouts with any number of engines, each of which may be similar to or different from the engine type illustrated herein.

In the representative vehicle configuration of FIG. 1, aircraft 100 is also equipped with three tail wings: a starboard-side (first) horizontal stabilizer 112, a port-side (second) horizontal stabilizer 114, and a vertical (third) stabilizer 116, each of which is mounted to and projects outwardly from a tail end the fuselage 102. The two horizontal stabilizers 112, 114 extend laterally from a rearmost empennage section of the aircraft 100, angled in a rearward direction from opposing sides of the fuselage 102. Vertical stabilizer 116, on the other hand, extends in an upward direction from the fuselage 102, oriented substantially perpendicular with respect to the horizontal stabilizers 112, 114. To control in-flight pitch and yaw of the aircraft 100, each of the tail-wing stabilizers 112, 114, 116 includes a respective control member 113, 115 and 117—illustrated in each instance as a pivotable tail rudder—that help to maintain the aircraft's directional stability. Although shown with a fuselage-mounted "tailplane" configuration having a single vertical tail wing and two horizontal stabilizers, the aircraft 100 may take on alternative aircraft configurations, including those with more than one vertical stabilizer as well as tailless, V-tail, tandem, and canard arrangements.

With reference next to the inset view of FIG. 1, there is shown an enlarged illustration of one of the "podded" turbofan engine 108, 110 assemblies of aircraft 100. For ease of design and simplicity of manufacture, the illustrated turbofan engines 108, 110 may be substantially identical in construction and functionality; as such, for purposes of brevity and conciseness, both turbofan engines 108, 110 are described below with reference to the port-side engine 110 assembly. In this illustrative example, the turbofan engine 110 includes a protective outer housing 120, or "nacelle", within which is packaged the various components of a turbofan jet engine system. The nacelle 120 is suspended from the underside of one of the aircraft's main wings 104, 106 by way of a rigid pylon 122 or similarly suitable airframe hardpoint. A concentrically aligned exhaust cone 124 and exhaust nozzle 126 set projects from a downstream end of the nacelle 120. At the upstream end of the nacelle 120, on the other hand, is a ducted fan 128 that uses mechanical energy generated by the engine's gas turbine (not visible in this view) to accelerate air rearwards and thereby propel the vehicle 100.

In this illustrative example, the turbofan engine 110 assembly includes a fluid intake system for directing a portion of the ambient airflow $A_{SW}$ into an engine core 118 of engine 110, while another portion of this ambient airflow $A_{SW}$ may be directed through a fluid inlet device 150 to an auxiliary aircraft system, such as a precooler (not shown). Engine core 118 contains, inter alia, a bladed low-pressure compressor 130 immediately adjacent the fan 128, a bladed high-pressure compressor 132 fluidly downstream from the low-pressure compressor 130, and a gas-burning combustor 134 downstream from both the high and low-pressure compressors 130, 132. Also located within the engine core 118 are high and low-pressure turbines 136 and 138, respectively, that are interposed between the combustor 134 and nozzle 126. While not explicitly shown, it should be appreciated that the turbofan engine 110 may take on a variety of available turbofan types, including low-bypass and high-bypass turbofan architectures as well as afterburning configurations.

An air passage 140 is formed between the nacelle 120 and engine core 118 such that a portion of the ambient airflow $A_{SW}$ drawn into the turbofan engine 110 flows across a washed surface 141 of a fan cowl 142. Fluid inlet device 150 is a "flush inlet" in that it is mounted substantially flush with the washed surface 141 so as to maintain a low-drag configuration while drawing air into the aircraft 100. In this regard, fluid inlet device 150 may function as an auxiliary air intake to supply a portion of fan air to a precooler (not shown). The precooler, in turn, uses this portion of fan air to cool air that is bled from engine core 118, e.g., to supply air to one or more subsystems of aircraft 100. By way of example, these systems may include an environmental control system (ECS), an anti-icing system, etc. While shown with a single flush inlet located inside an engine assembly, the aircraft 100 may include any number of the fluid inlet devices 150 positioned at assorted locations and orientations.

To help optimize aerodynamic performance of the aircraft 100 while providing aero-acoustic tone mitigation through minimized vortex shedding, the fluid inlet device 150 disrupts the coherency of unsteady flow across the inlet by varying the vortex transit length at the inlet and thereby reducing pressure oscillations inside the duct cavity. In accord with the representative example of FIGS. 3 and 4, the fluid inlet device 150 is composed of five primary segments: an inlet base 152, a pair of (first and second) sidewalls 154 and 156, an inlet ramp 158, and a highlight 160. It may be desirable, for at least some configurations, that the fluid inlet device 150—including its base 152, sidewalls 154, 156, ramp 158 and highlight 160—be fabricated as a one-piece, unitary structure. The fluid inlet device 150 of FIGS. 3 and 4, for example, may be cast or stamped and machined from a metallic material, blow molded or 3D printed from a polymeric material, or injection molded from a fiber-reinforced polymer (FRP). Furthermore, it should be appreciated that the fluid inlet device 150 may take on additional geometries and, optionally, may be scaled to size for alternative applications.

Inlet base 152 rigidly mounts to the engine nacelle 120 or other similarly suitable vehicle structure such that an exterior surface of the base 152 lays substantially flush with an air washed surface 141. As shown, the inlet base has a quadrilateral plan-view profile defined by four rectilinear terminal edges: a leading edge 151, a trailing edge 153 opposite the leading edge 151, and opposing first and second side edges 155 and 157, respectively, that extend between and connect the leading and trailing edges 151, 153. Defined through the exterior surface of the inlet base 152 is an inlet mouth 159 (FIG. 3) that fluidly couples with an internal air duct 143 of the nacelle 120, e.g., via inlet throat 161 (FIG. 4), e.g., such that ambient airflow $A_{SW}$ moving across the washed surface 141 and base 152 is drawn through the fluid inlet device 150 and into the aircraft 100. It should be appreciated that the plan-view profile of the inlet base 152 is exemplary in nature and should therefore not be considered limiting to the scope of this disclosure.

Figure 3:
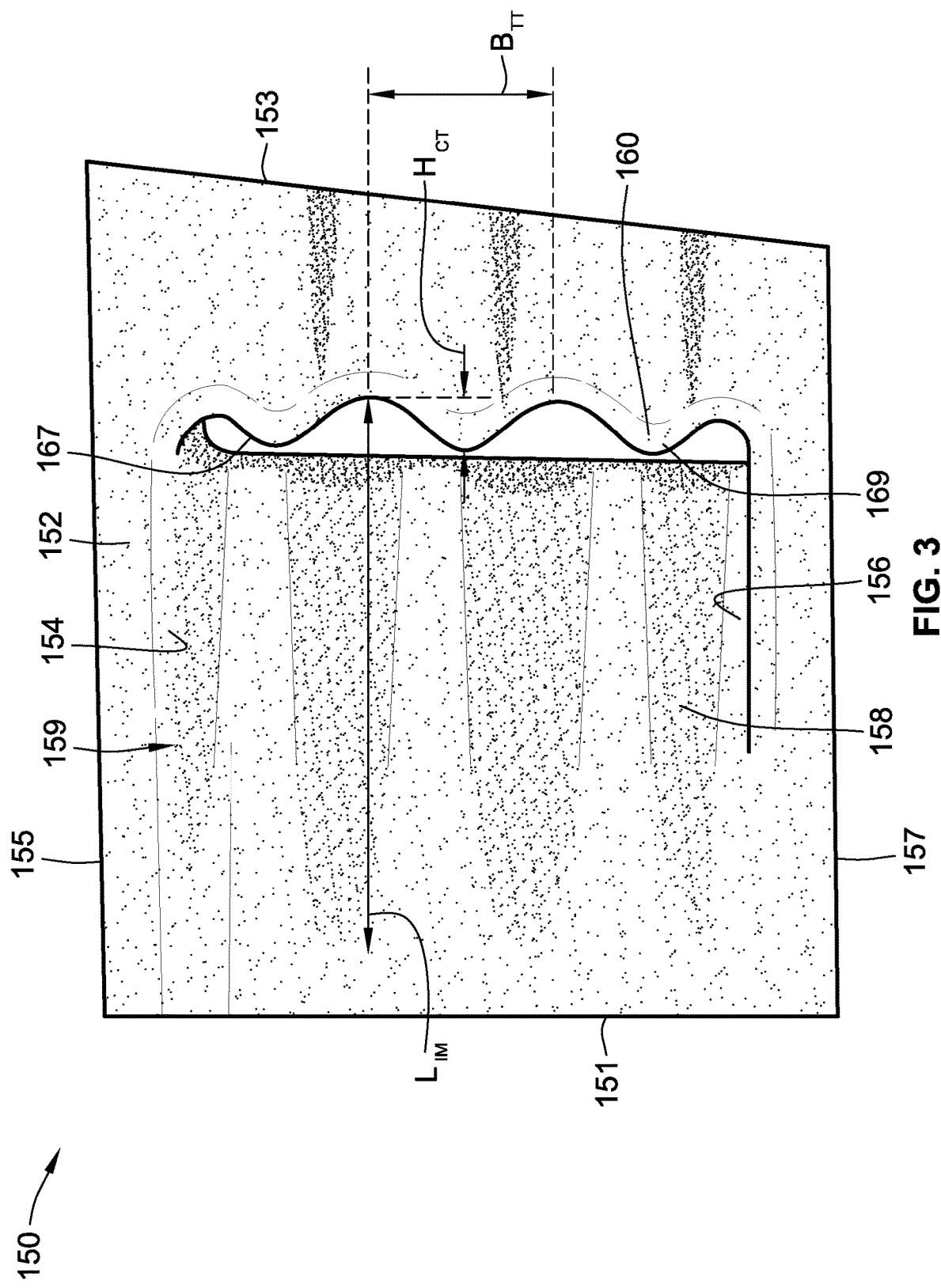
FIG. 3 is an enlarged, plan-view illustration of a representative flush air inlet device in accord with aspects of the disclosed concepts.
Figure 4:
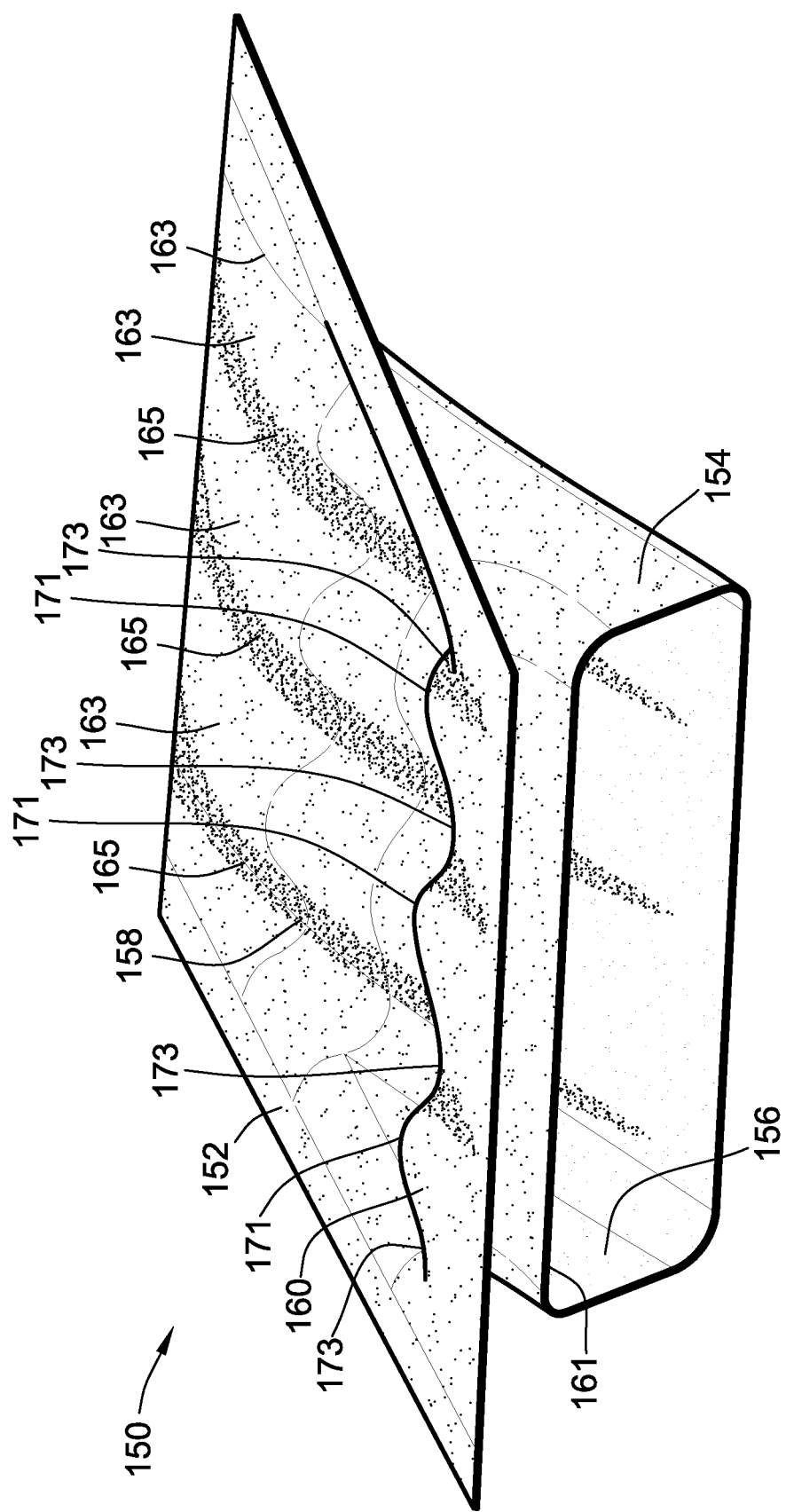
FIG. 4 is an enlarged, perspective-view illustration of the representative flush air inlet device of FIG. 3.

With continuing reference to both FIGS. 3 and 4, the inlet sidewalls 154, 156 project inward into the internal air duct 143, extending in a rearward direction from the inlet base 152. As best seen in the plan-view illustration of FIG. 3, both sidewalls 154, 156 extend the fore-aft length of the inlet mouth 159 from a leading edge to a trailing edge thereof. In accord with the illustrated example, the sidewalls 154, 156 are mutually parallel and both are substantially orthogonal to the inlet base 152 and ramp 158. Outer (proximal) ends of the two sidewalls 154, 156 are adjoined to the inlet base 152 while inner (distal) ends of the sidewalls 154, 156 are adjoined to the ramp 158. Both the outer and inner ends of the sidewalls 154, 156 may be rounded to facilitate a smooth transition of flowing fluid into the inlet mouth 159 and through the inlet throat 161. In the description of the fluid inlet device 150 of FIGS. 3 and 4, use of the terms "outer" and "outboard" may be defined to mean furthest from the duct 143 and/or closest to the washed surface 141, whereas the terms "inner" or "inboard" may be defined to mean closest to the duct 143 and/or furthest from the washed surface 141.

Also projecting inward into the internal air duct 143, extending in a rearward direction from the inlet base 152, is an inlet ramp 158 that helps to draw fluid flow into the inlet mouth 159 and direct it out through the throat 161. This inlet ramp 158 extends at an oblique angle (e.g., approximately 35 degrees) from the leading edge of the inlet mouth 159 and terminates at the inlet throat 161. The inlet ramp 158 is interposed between and adjoins at lateral edges thereof with the sidewalls 154, 156. For at least some embodiments, the length and angle of the inlet ramp 158 may be varied, for example, to accommodate alternative applications and packaging locations.

To help ameliorate coherent flow separation across the inlet mouth 159, an upper surface of the inlet ramp 158 may have an undulating curvature that extends crosswise between the sidewalls 154, 156. According to the illustrated architecture, the inlet ramp 158 has a sinusoidal transverse cross-section that oscillates in a lateral direction with respect to the inlet mouth 159. The inlet ramp's undulating curvature may be defined by a series of (four) recessed channels 163 that is interleaved with a series of (three) raised landings 165. These recessed channels 163 and raised landings 165 are elongated structural segments that extend in a fore-aft direction between the leading and trailing edges of the inlet mouth 159. As best seen in FIG. 4, the widths and depths of the elongated, recessed channels 163 vary in the fore-aft direction relative to the inlet mouth 159. In particular, the channels' 163 widths decrease and then increase while the depth increases then decreases in a direction from the leading edge to the trailing edge of the mouth 159.

In order to disrupt coherency of unsteady flow across the face of the fluid inlet 150 and thereby mitigate oscillating pressure-borne energy within the duct 143, the highlight 160 systematically varies the fore-aft vortex transit length across the inlet mouth 159 by repeatedly changing the distance from the leading (upstream) edge to the trailing (downstream) edge of the mouth 159. For instance, the highlight 160 is a shelf-like structure that is attached at the downstream end of the inlet base 152, projecting forward from the trailing edge towards the leading edge of the inlet mouth 159. The outermost surface of the highlight 160 may be substantially coplanar with the outermost surface the inlet base 152 and, thus, the washed surface 141 of the nacelle's fan cowl 142. With this arrangement, the highlight 160 defines the downstream, aft surface of the fluid inlet device 150 that is immediately adjacent the inlet mouth 159 and also defines the boundary between the inlet base's rearmost exterior surface and the inlet throat's interior surface. Optionally, a forward-facing, terminal edge 167 of the highlight 160 may be rounded to create a "fillet edge".

Extending transversely with respect the inlet base 152, the highlight 160 has a waveform plan-view profile 169 that oscillates in a crosswise direction with respect to the inlet mouth 159. As shown, the waveform profile 169 of the highlight 160 includes a sinusoidal waveform that extends transversely across the inlet mouth; transverse, terminal ends of the highlight 160 and waveform adjoin the sidewalls 154, 156. The waveform profile 169 may be defined by a series of (three) crests 171 that is interleaved with a series of (four) troughs 173. To help increase the aero-acoustic tone mitigation characteristics of the fluid inlet device 150, each crest 171 may be longitudinally aligned with a respective landing 165, and each trough 173 may be longitudinally aligned with a respective recessed channel 163. Similar to the inlet ramp 158, the outermost surface of the highlight 160 of FIGS. 3 and 4 (i.e., the surface exposed to ambient airflow $A_{SW}$ passing through air passage 140) may have an undulating curvature that extends crosswise relative to the inlet mouth 159. While the highlight profile 167 and the undulating outer surfaces of the highlight 160 and ramp 158 are portrayed as having sinusoidal geometries, these features may take on different waveform configurations with different defining characteristics (e.g., amplitude, frequency, etc.) than what are shown in the Figures.

To further optimize the aero-acoustic tone mitigation characteristics of the fluid inlet device 150, a ratio of an average crest-to-trough height $H_{CT}$ of the waveform profile 169 to an average fore-aft length $L_{IM}$ of the inlet mouth 159 may be between about 0.01 to about 1.0. As yet a further option, a highlight aspect ratio $AR_H$ of the waveform profile 169, which may be defined as: $AR_H=H_{CT}/B_{IT}$, may be between about 0.1 to about 10.0. In this instance, $H_{CT}$ is an average crest-to-trough height of the waveform profile 169, and $B_{IT}$ is an average trough-to-trough wavelength of the waveform profile 169. A ramp aspect ratio $AR_H$ of the undulating curvature of the inlet ramp 158, which may be defined as: $AR_H=H_{LC}/B_{LL}$, may be between about 0.01 and about 1.0. In this instance, $H_{LC}$ is an average landing-to-channel height of the ramp surface's undulating curvature, and $B_{LL}$ is an average landing-to-landing wavelength of the ramp surface's undulating curvature.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A fluid inlet device for a vehicle, the vehicle including a vehicle structure with a washed surface across which fluid flows and a duct for intake of the fluid, the fluid inlet device comprising:
    an inlet base configured to mount to the vehicle structure substantially flush with the washed surface, the inlet base having an outer base surface and defining an inlet mouth configured to fluidly couple with the duct;
    a pair of sidewalls attached to the inlet base and extending between a leading edge and a trailing edge of the inlet mouth;
    an inlet ramp interposed between and attached to the pair of sidewalls, the inlet ramp projecting at an oblique angle from the leading edge of the inlet mouth; and
    a highlight attached to the inlet base and projecting from the trailing edge of the inlet mouth towards the leading edge of the inlet mouth, the highlight including a waveform profile and an outer highlight surface located substantially coplanar with the outer base surface.

2. The fluid inlet device of claim 1, wherein the waveform profile includes a sinusoidal waveform extending transversely across the inlet mouth and adjoining the pair of sidewalls.

3. The fluid inlet device of claim 1, wherein the outer highlight surface includes an undulating curvature extending crosswise relative to the inlet mouth.

4. The fluid inlet device of claim 1, wherein the outer highlight surface is substantially coplanar with the washed surface when the inlet base is mounted to the vehicle structure.

5. The fluid inlet device of claim 1, wherein the highlight includes a filleted leading edge.

6. The fluid inlet device of claim 1, wherein a ratio of a crest-to-trough height of the waveform profile to a fore-aft length of the inlet mouth is between about 0.01 to about 1.0.

7. The fluid inlet device of claim 1, wherein a highlight aspect ratio $AR_H$ of the waveform profile is between about 0.1 to about 10.0 and is defined as:

$$AR_H=H/B$$

where H is a crest-to-trough height of the waveform profile, and B is a trough-to-trough wavelength of the waveform profile.

8. The fluid inlet device of claim 1, wherein the inlet ramp has an undulating curvature extending crosswise between the pair of sidewalls.

9. The fluid inlet device of claim 8, wherein the undulating curvature of the inlet ramp includes multiple recessed channels interleaved with multiple raised landings, the recessed channels and the raised landings extending in a fore-aft direction between the leading edge and the trailing edge of the inlet mouth.

10. The fluid inlet device of claim 9, wherein the waveform profile includes a plurality of crests interleaved with a plurality of troughs, each of the crests being aligned with a respective one of the raised landings, and each of the troughs being aligned with a respective one of the recessed channels.

11. The fluid inlet device of claim 9, wherein the channels have a width and/or a depth that varies in the fore-aft direction between the leading edge and the trailing edge of the inlet mouth.

12. The fluid inlet device of claim 1, wherein the sidewalls are substantially parallel to each other and substantially orthogonal to the inlet ramp and the inlet base.

13. The fluid inlet device of claim 1, wherein the inlet base, the pair of sidewalls, the inlet ramp, and the highlight are integrally formed as a single-piece structure.

14. An aircraft comprising:
    an airframe;
    a rotor assembly and/or a pair of wings attached to the airframe;
    an engine assembly with an engine nacelle attached to the airframe, the engine nacelle including a washed surface across which fluid flows and a duct for intake of the fluid; and
    a fluid inlet device including:
        an inlet base mounted to the engine nacelle substantially flush with the washed surface, the inlet base having an outer base surface and defining an inlet mouth fluidly coupled with the duct;
        a pair of sidewalls adjoined at outer ends thereof to the inlet base, extending between a leading edge and a trailing edge of the inlet mouth, and projecting into the nacelle towards the duct;
        an inlet ramp interposed between and adjoining inner ends of the pair of sidewalls, the inlet ramp projecting into the engine nacelle at an oblique angle from the leading edge of the inlet mouth; and
        a highlight adjoining the inlet base and projecting from the trailing edge of the inlet mouth towards the leading edge of the inlet mouth, the highlight including a waveform profile extending crosswise relative to the inlet mouth and an outer highlight surface substantially coplanar with the outer base surface.

15. A method of manufacturing a fluid inlet device for a vehicle, the vehicle including a vehicle structure with a washed surface across which fluid flows and a duct for intake of the fluid, the method comprising:

forming an inlet base configured to mount to the vehicle structure substantially flush with the washed surface, the inlet base including an outer base surface and defining an inlet mouth configured to fluidly couple with the duct;

attaching a pair of sidewalls to the inlet base, the sidewalls extending between a leading edge and a trailing edge of the inlet mouth;

attaching an inlet ramp to the inlet base with the inlet ramp interposed between the sidewalls, the inlet ramp projecting at an oblique angle from the leading edge of the mouth; and attaching a highlight to the inlet base, the highlight projecting from the trailing edge of the inlet mouth towards the leading edge of the inlet mouth and including a waveform profile, the highlight including an outer highlight surface located substantially coplanar with the outer base surface.

16. The method of claim 15, wherein the waveform profile includes a sinusoidal waveform extending transversely across the inlet mouth and adjoining the pair of sidewalls.

17. The method of claim 15, wherein the outer highlight surface includes an undulating curvature extending crosswise relative to the inlet mouth.

18. The method of claim 15, wherein the inlet ramp has an undulating curvature extending crosswise between the pair of sidewalls.

19. The method of claim 18, wherein the undulating curvature of the inlet ramp includes multiple recessed channels interleaved with multiple raised landings, and wherein the waveform profile includes a plurality of crests interleaved with a plurality of troughs, each of the crests being aligned with a respective one of the raised landings, and each of the troughs being aligned with a respective one of the recessed channels.

20. The method of claim 15, wherein the attaching the sidewalls, the inlet ramp, and the highlight to the inlet base includes integrally forming the inlet base, the sidewalls, the ramp, and the highlight as a single-piece structure.

21. A fluid inlet device for a vehicle, the vehicle including a vehicle structure with a washed surface across which fluid flows and a duct for intake of the fluid, the fluid inlet device comprising:

an inlet base configured to mount to the vehicle structure substantially flush with the washed surface, the inlet base defining an inlet mouth configured to fluidly couple with the duct;

a pair of sidewalls attached to the inlet base and extending between a leading edge and a trailing edge of the inlet mouth;

an inlet ramp interposed between and attached to the pair of sidewalls, the inlet ramp projecting at an oblique angle from the leading edge of the inlet mouth, the inlet ramp including an undulating curvature extending crosswise between the pair of sidewalls; and a highlight attached to the inlet base and projecting from the trailing edge of the inlet mouth towards the leading edge of the inlet mouth, the highlight including a waveform profile.

22. An aircraft comprising:

an airframe;

a rotor assembly and/or a pair of wings attached to the airframe;

an engine assembly with an engine nacelle attached to the airframe, the engine nacelle including a washed surface across which fluid flows and a duct for intake of the fluid; and a fluid inlet device including:

an inlet base mounted to the engine nacelle substantially flush with the washed surface, the inlet base defining an inlet mouth fluidly coupled with the duct;

a pair of sidewalls adjoined at outer ends thereof to the inlet base, extending between a leading edge and a trailing edge of the inlet mouth, and projecting into the nacelle towards the duct;

an inlet ramp interposed between and adjoining inner ends of the pair of sidewalls, the inlet ramp projecting into the engine nacelle at an oblique angle from the leading edge of the inlet mouth, the inlet ramp including an undulating curvature extending crosswise between the pair of sidewalls; and a highlight adjoining the inlet base and projecting from the trailing edge of the inlet mouth towards the leading edge of the inlet mouth, the highlight including a waveform profile extending crosswise relative to the inlet mouth.

23. A method of manufacturing a fluid inlet device for a vehicle, the vehicle including a vehicle structure with a washed surface across which fluid flows and a duct for intake of the fluid, the method comprising:

forming an inlet base configured to mount to the vehicle structure substantially flush with the washed surface, the inlet base defining an inlet mouth configured to fluidly couple with the duct;

attaching a pair of sidewalls to the inlet base, the sidewalls extending between a leading edge and a trailing edge of the inlet mouth;

attaching an inlet ramp to the inlet base with the inlet ramp interposed between the sidewalls, the inlet ramp projecting at an oblique angle from the leading edge of the mouth, the inlet ramp including an undulating curvature extending crosswise between the sidewalls; and attaching a highlight to the inlet base, the highlight projecting from the trailing edge of the inlet mouth towards the leading edge of the inlet mouth and including a waveform profile.

\* \* \* \* \*